United States Patent
Lehwany

(10) Patent No.: US 8,370,632 B2
(45) Date of Patent: Feb. 5, 2013

(54) APPARATUS AND METHOD FOR INCORPORATING SIGNATURE INTO ELECTRONIC DOCUMENTS

(75) Inventor: Belal Lehwany, Araba (IL)

(73) Assignee: VPSign Ltd., Nazareth Ilit (IL)

( * ) Notice: Subject to any disclaimer, the term of this patent is extended or adjusted under 35 U.S.C. 154(b) by 1048 days.

(21) Appl. No.: 11/913,784

(22) PCT Filed: Apr. 20, 2006

(86) PCT No.: PCT/IL2006/000497
§ 371 (c)(1),
(2), (4) Date: Nov. 7, 2007

(87) PCT Pub. No.: WO2006/111979
PCT Pub. Date: Oct. 26, 2006

(65) Prior Publication Data
US 2009/0031132 A1    Jan. 29, 2009

Related U.S. Application Data

(60) Provisional application No. 60/671,809, filed on Apr. 18, 2005.

(51) Int. Cl.
*G06F 21/00* (2006.01)
(52) U.S. Cl. .......................... 713/176; 726/2
(58) Field of Classification Search ................. 713/176; 726/2
See application file for complete search history.

(56) References Cited

U.S. PATENT DOCUMENTS

| | | | | |
|---|---|---|---|---|
| 5,818,955 A | * | 10/1998 | Smithies et al. | 382/115 |
| 6,170,744 B1 | * | 1/2001 | Lee et al. | 235/380 |
| 6,904,524 B1 | * | 6/2005 | Jaeger et al. | 713/176 |
| 7,051,364 B1 | * | 5/2006 | Tackman et al. | 726/3 |
| 7,523,315 B2 | * | 4/2009 | Hougaard et al. | 713/176 |
| 2003/0012374 A1 | * | 1/2003 | Wu et al. | 380/44 |
| 2003/0084002 A1 | * | 5/2003 | Ericson et al. | 705/67 |
| 2003/0103071 A1 | * | 6/2003 | Lusen et al. | 345/705 |
| 2004/0117627 A1 | * | 6/2004 | Brewington | 713/176 |
| 2004/0230807 A1 | * | 11/2004 | Baird et al. | 713/182 |
| 2005/0039018 A1 | * | 2/2005 | Wittkotter | 713/176 |
| 2005/0132195 A1 | * | 6/2005 | Dietl | 713/176 |
| 2005/0132196 A1 | * | 6/2005 | Dietl | 713/176 |
| 2005/0229006 A1 | * | 10/2005 | De Moura et al. | 713/186 |
| 2005/0289059 A1 | * | 12/2005 | Brewington et al. | 705/45 |

FOREIGN PATENT DOCUMENTS

WO    WO 2006/111979    10/2006

* cited by examiner

*Primary Examiner* — Michael Pyzocha

(57) ABSTRACT

There is presented a method and apparatus for incorporating digital signature to within a document for paper-less office. The method comprises generating the document to be signed on a computer and transferring it and displaying it on a device for incorporating digital signature wherein the device comprises a screen, signature means such as electronic pen or fingerprint capturing device, and et least one smart card reader. Then, the document is being digitally signed. The digitally signed document is being encrypted and transferred to the computer so as to prevent restoration of the digital signature. From the customer side, the procedure is based on "what you see is what you sign".

7 Claims, 2 Drawing Sheets

APPARATUS AND METHOD FOR INCORPORATING SIGNATURE INTO ELECTRONIC DOCUMENTS

FIELD OF THE INVENTION

The present invention is related to electronically signed documents. More particularly, the present invention is related to incorporating signature into electronic documents.

BACKGROUND OF THE INVENTION

In an era of electronic documentation and electronic handling of documents, there is still knowledge and capability gap in efficiently handle paper documents that carry a legal signature. The "paperless office" concept has been around for well over a decade. It has failed to move from theory to reality, however, because of cultural reticence, unequal access to technology, and the lack of an adequate legal and service infrastructure to support such a paradigm shift. At present, most large organizations such as banking institutes spend large sums of money for handling of signed documents. The handling activities are mandatory by law since the legislation involved with digital signature—public key infrastructure PKI, has not yet determined in some situations any practical means of creating fully electronic documents that allow their submission as authentic evidence in instates such as courts, as an example.

Several attempts were made in order to allow incorporation of electronic signatures into electronic documents. The production of an electronic signature is already known in the art; however, incorporating the signature in an electronic document is the problem to be solved. An example is disclosed in U.S. Pat. No. 5,689,567 "Electronic Signature Method and Apparatus" by Miyauchi. In another example taught in patent application published as WO03009217 "Electronic Signing of Documents" by Wu et al., a method for a person to sign a document by use of an electronic pen is introduced.

Another computer-based method for capturing and verifying a handwritten signature is disclosed in U.S. Pat. No. 6,064,751 "Document and Signature Data Capture System and Method" by Smithies et al. .and an identity authentication system that can be used in commercial transactions at a point-of-sale terminal is described in patent application published as WO03036861 "Security Access System" by Black. Another solution is described in patent application published as WO0223316 "Apparatus and Method for Acquiring Information and Producing a Signed Document" by Ornellas et al.

In neither of the available solutions, the person signing the document by electronic means is not sure that his signature is used properly and he signs on the document that he wishes to sign. In case a customer enters an organization such as a bank and need to sign a document, the fact that he has a private key container (like smart card) for signature, or any other biometric means, he needs to be sure that what he sees is what he signs.

The proposed solutions lack the security feature by which the digital signature becomes a part of the original document. Actually, the proposed solutions are not far from being scanned image of the signature once captured, can be cut and pasted onto any electronic document, making forgery a simple matter. There is a need to produce a digitized signature. Digital signatures are actual transformation of an electronic message using public key cryptography. Through this process, the digital signature is tied to the document being signed, as well as to the signer, and therefore cannot be reproduced. Most importantly, digitally signed electronic transactions should have the same legal weight as transactions signed in ink.

SUMMARY OF THE INVENTION

It is an object of the present invention to provide an electronic device that is a hardware device that is totally secured and protected against manipulation or error by means of programming.

It is another object of the present invention to an electronic device that is clear and plain evidence to the signer that his signature becomes a part of the original document. The principle of "What You See Is What You Sign" or WYSIWYS is achieved.

It is therefore provided in accordance with the present invention a device for incorporating digital signature to within a document comprising:
  screen adapted to display the document;
  signature means electronically communicating with said screen adapted to transfer an un-restorable digital signature to said document;
  at least one reader adapted to provide digital signature and digitally sign the document;
  interface port adapted to transfer the document from a computer to the device and transfer a signed document back to the computer;
  whereby the document, which is generated on said computer, displayed on said screen is digitally signed and transferred with the embedded un-restorable digital signature to said computer.

Furthermore in accordance with another preferred embodiment of the present invention, said signature means is selected from a group of means such as electronic pen, biometric fingerprint, and other biometric data.

Furthermore in accordance with another preferred embodiment of the present invention, said reader is selected of a group of readers such as smart card readers or reader for private key container like dongle Furthermore in accordance with another preferred embodiment of the present invention, said signature means is an electronic pen that can be based on technologies selected from a group of technologies such as light detection, sound or ultrasound detection.

Furthermore in accordance with another preferred embodiment of the present invention, said screen is an LCD screen.

Furthermore in accordance with another preferred embodiment of the present invention, screen is a touch screen.

Furthermore in accordance with another preferred embodiment of the present invention, the device further comprises control button adapted to allow interaction with the displayed document.

Furthermore in accordance with another preferred embodiment of the present invention, said screen is sized to an A4 document.

Furthermore in accordance with another preferred embodiment of the present invention, said at least one reader is incorporated within said device.

Furthermore in accordance with another preferred embodiment of the present invention, said smart card reader is separated of said device and is electronically communicating with the device.

It is further provided in accordance with yet another preferred embodiment of the present invention, a method for incorporating digital signature to within a document comprising:
  generating the document to be signed on a computer;

transferring the document to a device for incorporating digital signature wherein said device comprising a screen, signature means, and at least one smart card reader;

displaying the document on said screen;

digitally signing the document through said at least one card readers;

applying a digital signature onto the document using said signature means;

transferring the digitally signed document to the computer;

sealing the document so as to prevent restoration of said digital document.

Furthermore in accordance with another preferred embodiment of the present invention, digitally signing the document is performed by a PKI.

Furthermore in accordance with another preferred embodiment of the present invention, the device further comprising applying changes onto the document using an electronic pen.

Furthermore in accordance with another preferred embodiment of the present invention, the device further comprising applying a hash and a digital signature in a hexagonal format to said document for a printed version of the document.

BRIEF DESCRIPTION OF THE DRAWINGS

An exemplary embodiment of the invention is described in the following section with respect to the drawings. The same reference numbers are used to designate the same or related features on different drawings. The drawings are generally not drawn to scale.

DETAILED DESCRIPTION OF EXEMPLARY EMBODIMENT

The "paperless office" concept has been around for well over a decade. However, it has failed to move from theory to reality because of cultural reticence, unequal access to technology, and the lack of an adequate legal and service infrastructure to support such a paradigm shift. The present invention provides a hardware device as well as a method allowing a customer to see the document he is about to sign and then sign the document with his own handwritten signature or any other biometric means that is identified solely with the person that signs the document even in multi-page documents. The digital signatures as well as any other handwritten or other changes that may be applied onto the document are immediately embedded into the graphics of the original document in a way that prevents them from being separated from the document from that point on.

Later, the document is marked and sealed using the international standard of public key infrastructure PKI, and is returned to the computer that generated the document in the first place. Since sealing the document is being performed using a PKI, there is no means to restore the digital signature and copy it to another document. The digital signature that is being produced using the method of the present invention is an un-restorable signature that is intended to a single document. Similarly to a handwritten signature that a person signs on an original hard-copy paper document.

In the present document, the expression "digital signature" represents any type of signature such as handwritten signature, fingerprint signature, PKI signature, or any other means of private identification.

The following detailed description is of the best presently contemplated modes of carrying out the present invention. This description is not to be taken in a limiting sense, but is made merely for the purpose of illustrating the general principles in accordance with the present invention. The scope of the present invention is best defined by the appended claims.

Figure 1:
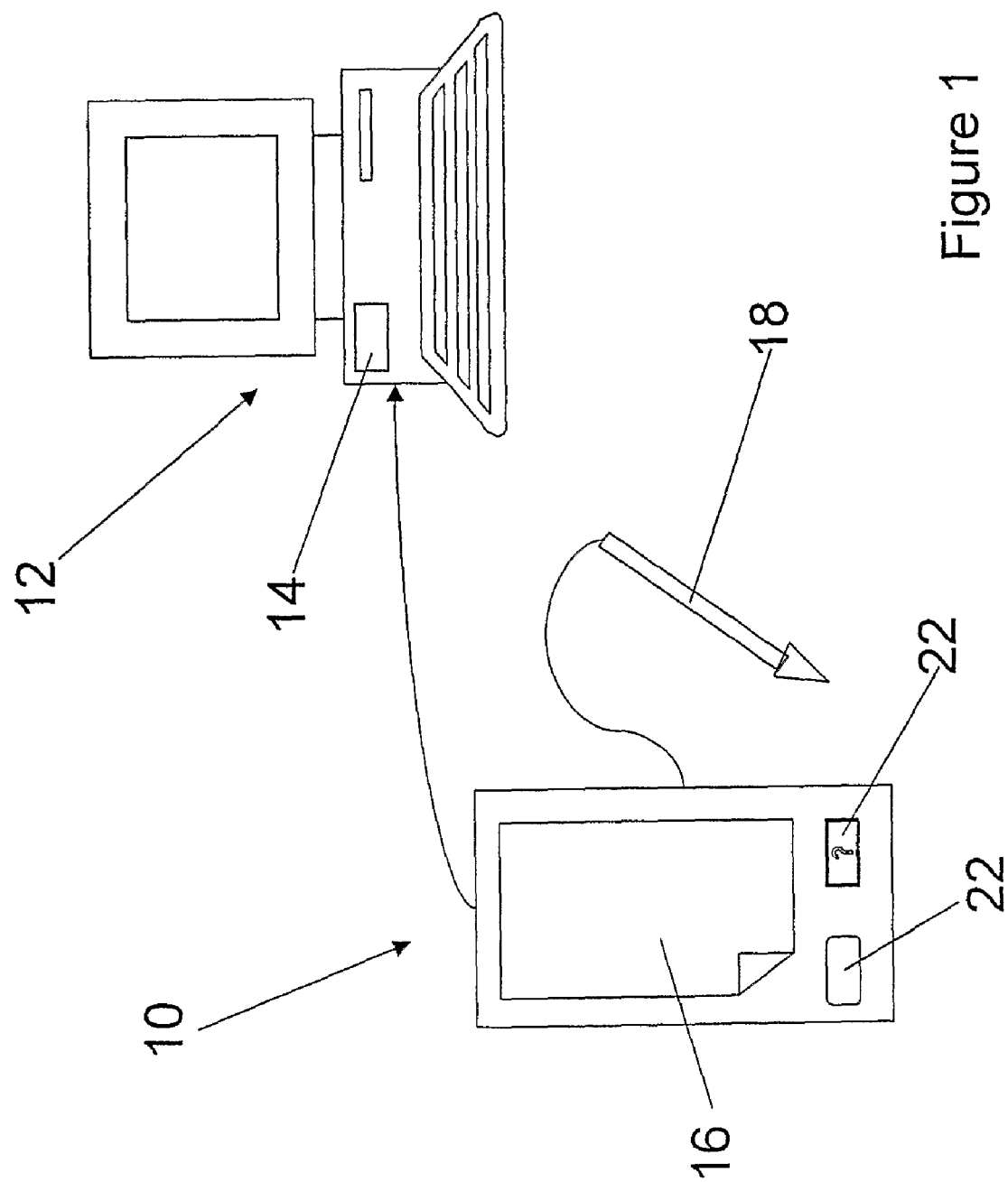
FIG. 1 illustrates a device for incorporating digital signature into electronic documents in accordance with a preferred embodiment of the present invention.

Reference is now made to FIG. 1 illustrating a device for incorporating digital signature into electronic documents in accordance with a preferred embodiment of the present invention. Digital signature incorporation device 10 is adapted to electronically communicate with a computer 12. Device 10 can be installed as an external device to computer 12 using a USB connection, for example. Device 10 can be equipped with any type of input/output ports in order to allow efficient communication with computer 12 or any other marginal devices such as USB, infrared, Bluetooth, wireless, cellular and so on.

Software 14 that is loaded onto computer 12 using software drivers or through an Internet connection is adapted to send a printout of a document formed by any available and known in art means to device 10. Computer 12 is provided with supplementary software and hardware that are adapted to handle the document before it is signed and after the procedure is finished as known in the art. Therefore, computer 12 is adapted to form files as mentioned herein before and means adapted to store the resultant document in an archive, save the document in a permanent folder or any alternative location, print a paper copy of the document or route the document to another program for further handling.

Device 10 comprises a screen 16 that is preferably an LCD screen. Screen 16 can be preferably a touch screen or a regular one and is preferably sized to substantially correspond an A4 page size so that a document that is displayed onto the screen can be legibly read. It should be noted that any other size can be utilized in the device of the present invention.

Digital signature means is provided to device 10 so as to allow the person or parties signing the document to sign the document using a handwritten signature or any other biometric signature such as fingerprint, iris identification, photograph or the like.

Optionally, device 10 further comprises an electronic pen 18 that is electronically connected to device 10. Electronic pen 18 can be based on any technology known in the art or any other technology such as light detection, sound/ultrasound detection, etc. Optionally, other biometric devices can be implemented with the device and by no means limit the scope of the present invention.

At least one, but preferably two smart card readers 20 are provided to device 10. It should be noticed that other readers or controllers of private key container, like dongle can be used without limiting the scope of the present invention. Card readers 20 can be incorporated in the device as shown in FIG. 1 or can be separate devices that are being electronically communicating with the device in a manner known in the art. Smart card readers 20 are adapted to encrypt the document hash string using a private key that is stored in the smart card or any other private key container.

Control buttons 22 are provided within device 10 so as to allow interactive operations to be performed by the users on the document such as browsing a document. Optionally, control buttons can be virtually displayed preferably on the margins of LCD screen 16.

The device for incorporating a digital signature of the present invention is to be used using a preferred method in which two parties are about to sign a document, while one of the parties has a computer incorporated with the device of the present invention, in a preferable case, the organization, and the other party has only his own private key container, or will use his biometric parameters to sign the document. Exemplary parties that can use the method of the present invention are a bank and the bank's customer or two parties in a lawyer's office.

Figure 2:
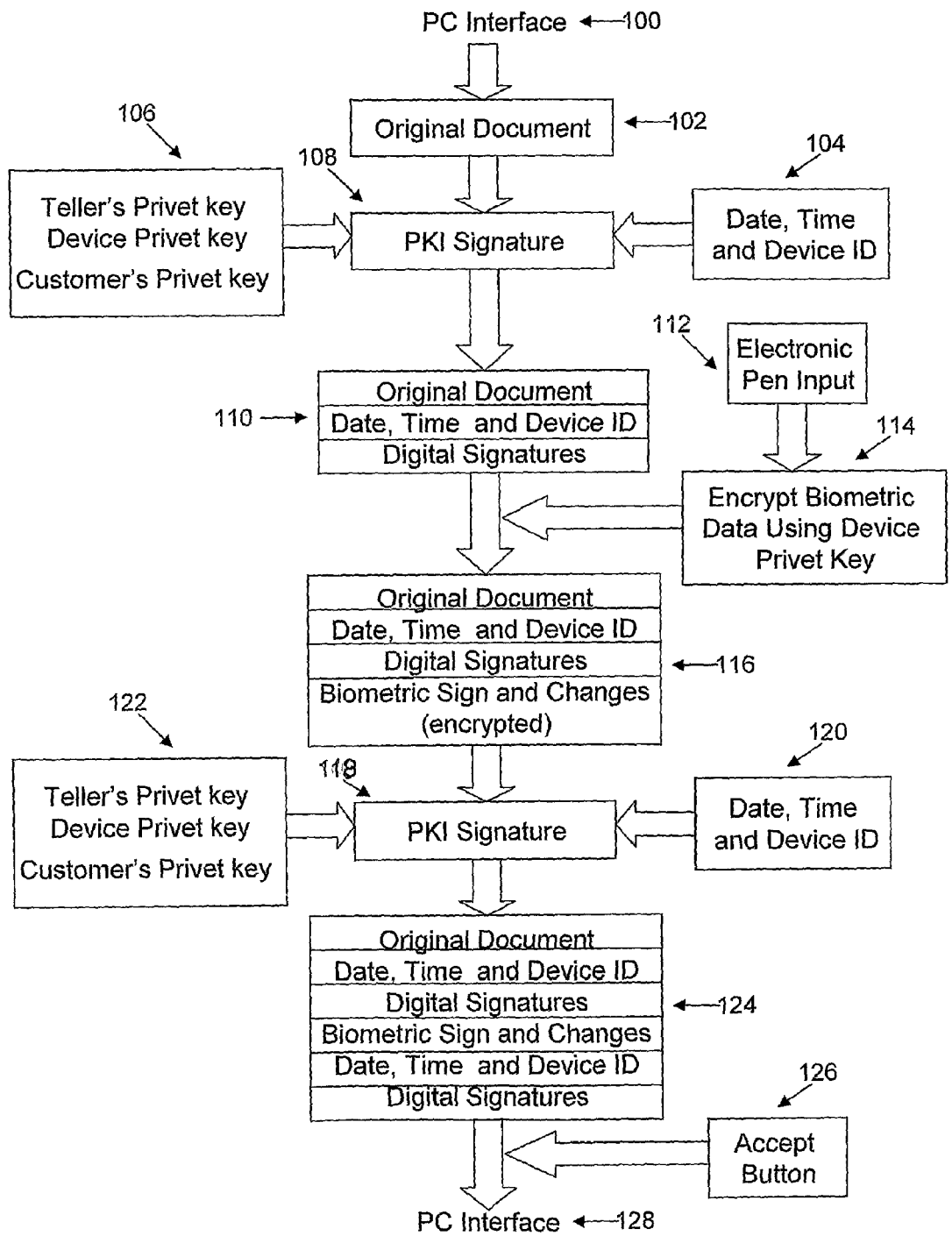
FIG. 2 illustrates a flowchart of a method for incorporating digital signature into electronic documents in accordance with a preferred embodiment of the present invention.

Reference is now made to FIG. 2 illustrating a flowchart of a method for incorporating digital signature into electronic documents in accordance with a preferred embodiment of the present invention. As an example, a procedure taken place in a bank between a bank representative (bank teller) and a customer. Using the software of the bank's computer, the teller is sending a printing command to print a certain original document 102 onto the device for incorporating a digital signature using a PC interface 100. As the document is being transferred to the device, a time stamp and device ID 104 are added to the document and then it is digitally signed 108 by the teller's private key, the devices private key 106, The customer can see now the original document displayed on the LCD screen of the device 110. In this stage, the original document is signed with the PKI signature and preferably also with the date and time as well as some identification of the device itself and tiller.

The customer as well as the teller can browse the document displayed onto the screen using actual or virtual buttons. If several pages are displayed, the users can browse through the pages or zoom in/zoom out in a certain location of the document. Using an electronic pen 112, the customer can sign the displayed document or enter changes he wishes to the document. The changes or the signature are displayed immediately on the LCD displayed document in the appropriate place where the customer wishes to insert them. Moreover, the changes or digital signature is being embedded to within the document's graphic file. Preferably, the changes or the digital signature is also recorded in a non-readable appendix section of the file that is created that includes biometric data generated by the signer's hand movement 114. The output file 116 comprises a graphic document that includes an original document; handwritten changes and/or signature added onto the document; "authentication stamp" that may include details such as name of the organization, branch and representative, exact time and date of last change performed on the document, unique identification of the device, and name and ID of the signing customer. Part of the information is preferably extracted from the smart cards through the card readers.

Optionally and as mentioned herein before, the customer can sign the document using digital signature means other than handwritten signature. The digital means can be any biometric means such as fingerprint capturing device.

The output file will comprise also a non-readable section that is encrypted using the private keys of the device, The non-readable section 118 can include among others, the biometric data recorded during signing the document, a time stamp of every change or signature 120, the information of the teller's public key and the customer's private key 122.

Now, the final signed and changed document is hashed using MD4, MD5 or any other hashing algorithm, and the hash is encrypted 124 using the private key of the device, the tiller and the customer if he has his own private key. It should be emphasized that there is no possibility using the method of the present invention as described herein to crack the digital signature of the customer from the signed document, and to restore it in order to sign with this signature other documents.

After the document has been signed, it is accepted 126 and sent back to the computer 128 preferably through the originating port or the originating program. The originating program or an add-on utility that can be supplied by with the device, is adapted to handle the file either automatically according to present configuration or particular operator decision per document, all configurable.

After the document had been sent to the computer and the procedure is finished, the device is being cleared and cleaned so that no stored data or signatures are being preserved in the device.

The private key of the device does not have a public key. Instead, it has an additional private key that is kept at the certification authority CA as known in the art. The signature's biometric parameters can only be accessed and compared with the graphic data in the document via a web application or any other application located at the CA.

The method of the present invention provides a very simple means to ensure that the document is signed by the signer, and/or to compare two signatures from two different documents, using known algorithms.

A special application will be used to print a copy of the document to be kept by the customer, In the printed data, the hash and the tiller signature will be represented in Hexadecimal format, or as a barcode (preferably 2D barcode), or any other way that enable automatic reading. This will enables the customer to verify the signature using the Web application or any other type of application, by reading the hash and the signature, applying the tiller public key on the signature and comparing the output with the hash. The representation also serves as an ID of the document that the organization can present to the customer when required. This will protect the customer against intentional or unintentional destruction of his/hers document by the organization. The customer can claim that he have an original document established by the organization. The sole entity that can generate this pair of hash and signature is the organization.

While the invention has been described with reference to certain exemplary embodiments, various modifications will be readily apparent to and may be readily accomplished by persons skilled in the art without departing from the spirit and scope of the above teachings.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. The terms "comprise", "include" and their conjugates as used herein mean "include but are not necessarily limited to".

The invention claimed is:
1. A digital signature method comprising:
   at a time when the digital signature incorporation device is coupled to the host device as a peripheral device via a host-peripheral interface, operating the digital signature incorporation device to:

a. receive an electronic document into the digital signature incorporation device from the host device via the host-peripheral interface;
b. display the electronic document of the received data object on a display screen of the digital signature incorporation device;
c. in response to a user application of an electronic handwriting signature to the document using an electronic pen at a time when the electronic document is displayed on the display screen, modify an appearance of the displayed electronic document on the display screen to reflect visual changes to the electronic document of the applied electronic handwriting signature;
d. subject, to a PKI encryption, a hash of an electronic representation of the document as visually modified by the application of the electronic handwriting signature to the electronic document by the electronic pen;
e. subject, to a PKI encryption, recorded biometric data generated by movement of the user's hand while applying the electronic signature; and
f. send, from the digital signature incorporation device to the host device via the host-peripheral interface an output file comprising:
  i) a graphical description of the original electronic document and the visual changes to the electronic document of the applied electronic handwriting signature;
  ii) the PKI-encrypted biometric data; and
  iii) the PKI-encrypted hash.

2. The method of claim 1 wherein the receiving of the electronic document of step (a) is carried out in response to a print command on the host device to print the electronic document.

3. The method of claim 1 wherein the PKI encryption of the hash of step (d) is carried out using a private key received from a smart card via a smart card reader that is incorporated into the digital signature incorporation device.

4. A digital signature incorporation device comprising:
a. a device interface;
b. a display screen; and
c. electronic circuitry that is configured, at a time when the digital signature incorporation device is coupled to the host device as a peripheral device via the device interface, to effect the following:
  i. receive an electronic document into the digital signature incorporation device from the host device via the device interface;
  ii. display the electronic document of the received data object on the display screen;
  iii. in response to a user application of an electronic handwriting signature to the document using an electronic pen at a time when the electronic document is displayed on the display screen, modify an appearance of the displayed electronic document on the display screen to reflect visual changes to the electronic document of the applied electronic handwriting signature;
  iv. subject, to a PKI encryption, a hash of an electronic representation of the document as visually modified by the application of the electronic handwriting signature to the electronic document by the electronic pen;
  v. subject, to a PKI encryption, recorded biometric data generated by movement of the user's hand while applying the electronic signature; and
  vi. send, from the digital signature incorporation device to the host device via the device interface an output file comprising:
    A) a graphical description of the original electronic document and the visual changes to the electronic document of the applied electronic handwriting signature;
    B) the PKI-encrypted biometric data; and
    C) the PKI-encrypted hash.

5. The digital signature incorporation device of claim 4 further comprising:
d. a smartcard reader incorporated into the device, wherein the electronic circuitry is configured to effect the PKI encryption of the hash of the electronic document representation using a private key received from a smart card via the smart card reader.

6. A system comprising:
a host device; and
the digital signature incorporation device of claim 4, wherein the host device is configured to send the electronic document that is received by the digital signature incorporation device in response to a print command on the host device.

7. A digital signature method comprising:
at a time when the digital signature incorporation device is coupled to the host device as a peripheral device via a host-peripheral interface, operating the digital signature incorporation device to:
  b. receive an electronic document into the digital signature incorporation device from the host device via the host-peripheral interface;
  b. display the electronic document of the received data object on a display screen of the digital signature incorporation device;
  c. in response to a user application of an electronic handwriting signature to the document using an electronic pen at a time when the electronic document is displayed on the display screen, modify an appearance of the displayed electronic document on the display screen to reflect visual changes to the electronic document of the applied electronic handwriting signature;
  d. subject, to a PKI encryption, a hash of an electronic representation of the document as visually modified by the application of the electronic handwriting signature to the electronic document by the electronic pen;
  e. send, from the digital signature incorporation device to the host device via the host-peripheral interface an output file comprising:
    i) a graphical description of the original electronic document and the visual changes to the electronic document of the applied electronic handwriting signature; and
    ii) the PKI-encrypted hash,
wherein the receiving of the electronic document of step (a) is carried out in response to a print command on the host device to print the electronic document.

* * * * *